Nov. 30, 1965 H. H. HEYDN 3,220,053
SAUSAGE LINKING APPARATUS
Filed April 14, 1964

INVENTOR.
Hans H. Heydn

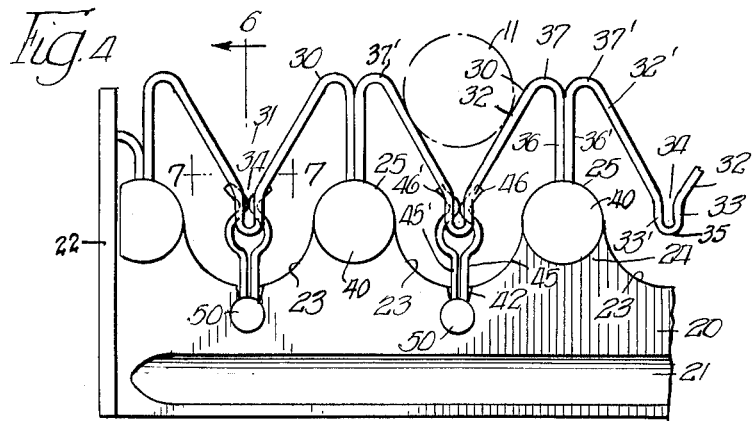
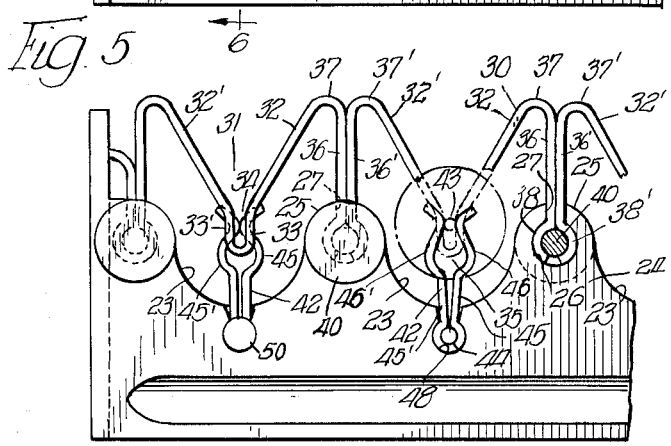
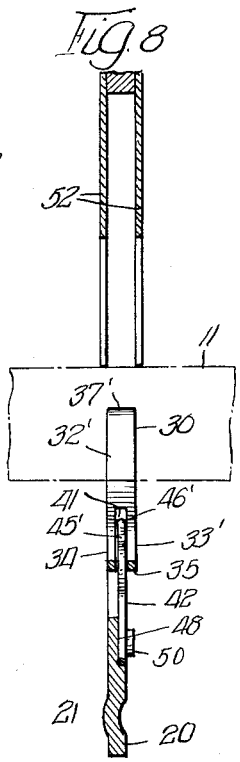
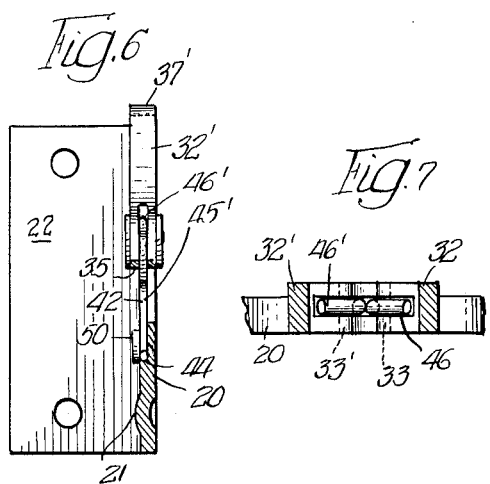
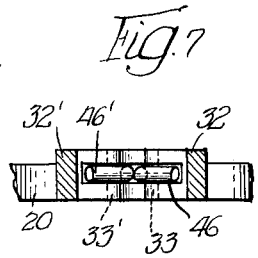
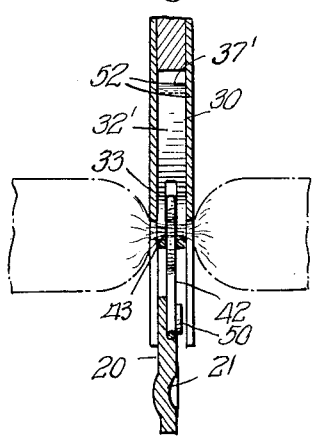
INVENTOR.
Hans H. Heydn United States Patent Office 3,220,053
Patented Nov. 30, 1965

3,220,053
SAUSAGE LINKING APPARATUS
Hans H. Heydn, Madison, Wis., assignor to Oscar Mayer & Co., Inc., Chicago, Ill., a corporation of Illinois
Filed Apr. 14, 1964, Ser. No. 359,693
6 Claims. (Cl. 17—34)

This invention relates to the manufacture of sausages wherein relatively long lengths of filled or stuffed casing are divided into links by constricting the casing at intervals corresponding to the desired length of sausages and the links are thereafter advanced in connected relation and in a continuously moving stream through processing apparatus where they are cooked, smoked or otherwise prepared for marketing.

It is a general object of the invention to provdie improved apparatus for dividing stuffed sausage casing into link forming lengths which is particularly adapted for incorporation in a sausage linking and processing apparatus of the type disclosed in co-pending application Serial No. 185,167, filed April 4, 1962, and in Patent No. 3,059,272, dated October 23, 1962.

It is a more specific object of the invention to provide in a sausage linking and conveying apparatus of the type in which lengths of stuffed casing are fed to a traveling conveyor on which the casings are divided into link forming sections and thereafter advanced to the processing chamber, a linking bar assembly for the conveyor which has a plurality of individual casing constricting and holding devices mounted thereon in side-by-side relation and each of which is adapted to constrict a section of a stuffed casing so as to form a neck portion between successive links and to frictionally retain the same on the conveyor.

A still further object of the invention is to provide in a sausage making machine having a sausage linking and carrying conveyor which includes longitudinally spaced cross bars each having mounted thereon a plurality of casing constricting and holding devices which are aligned longitudinally of the conveyor to permit multiple lines of filled casings to be divided into sausage forming links, the casing constricting devices each having associated therewith a member for frictionally retaining the constricted portion of the casing on the associated cross bar and preventing accidental removal or release of the same while the links are carried through the processing chambers.

It is another object of the invention to provide a link forming assembly for a sausage linking machine which comprises a conveyor having a plate-like supporting bar extending transversely thereof and a plurality of necking devices mounted thereon in side-by-side relation which necking devices are adapted to receive lines of stuffed casing and to constrict the casings at intervals so as to form the same into links, and each of the necking devices having an associated spring clamp member for normally holding the neck forming portion of the casing on the supporting bar, the spring member being expandible so that the neck portion may be withdrawn therefrom at a station where it is desired to release the links and permit removal thereof from the conveyor.

These and other objects and advantages of the invention will be apparent from a consideration of the apparatus which is shown by way of illustration in the accompanying drawings wherein:

FIGURE 4 is a fragmentary view, to an enlarged scale, showing one end of a cross bar assembly;

FIGURE 5 is a fragmentary view similar to FIGURE 4 showing certain of the elements in a different position and with portions broken away;

FIGURE 6 is a cross section taken on the line 6—6 of FIGURE 4;

FIGURE 7 is a fragmentary cross section taken on the line 7—7 of FIGURE 4;

FIGURE 8 is a fragmentary cross section taken on the line 8—8 of FIGURE 3, to an enlarged scale; and FIGURE 9 is a fragmentary cross section similar to FIGURE 8, with the link forming members in a different position.

Figure 1:
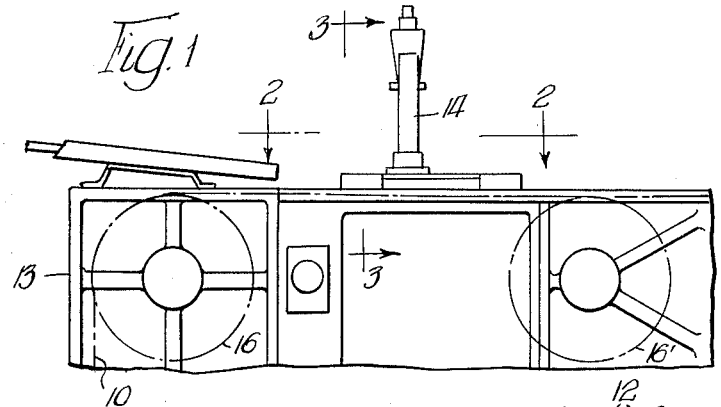
FIGURE 1 is an elevation of a portion of a sausage linking and conveying apparatus which embodies the principal features of the invention, the apparatus being shown in part diagrammatically.
Figure 2:
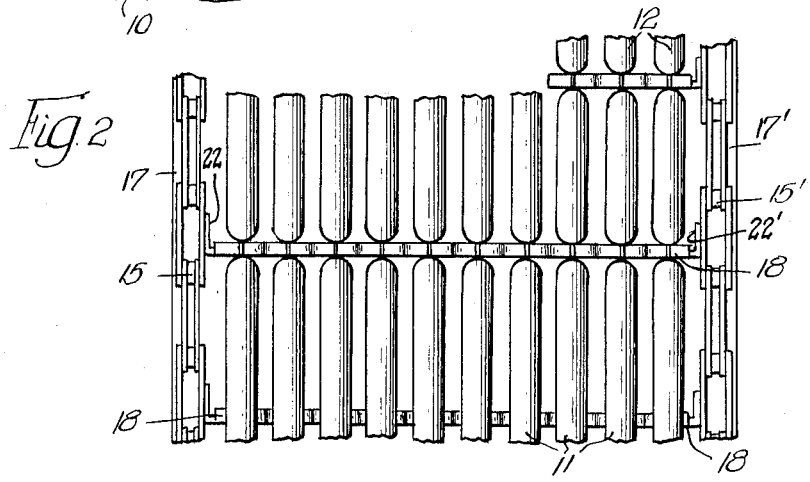
FIGURE 2 is a transverse view taken generally on the line 2—2 of FIGURE 1, to an enlarged scale showing a portion of the link forming and carrying conveyor.
Figure 3:
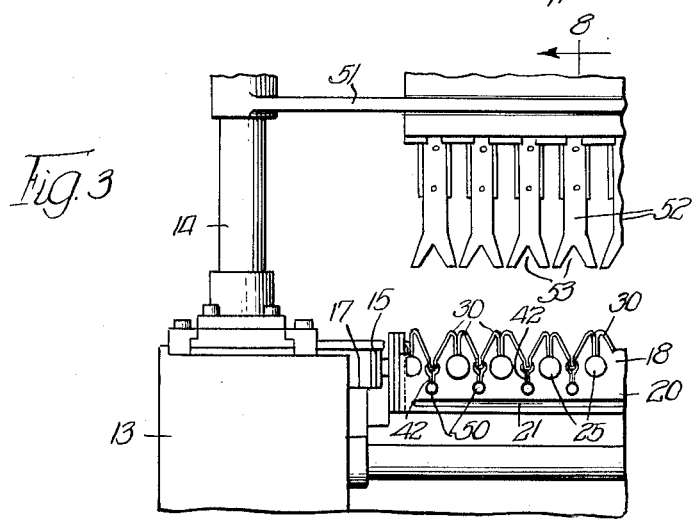
FIGURE 3 is a cross section taken generally on the line 3—3 of FIGURE 1, to an enlarged scale, and illustrating an end portion of one of the link forming cross bar forming assemblies and associated casing constricting mechanism.

Referring to FIGURES 1 to 3 of the drawings, there is illustrated a portion of a continuously traveling endless chain conveyor 10 which forms the link receiving and supporting conveyor for an apparatus which is adapted to divide a plurality of lengths of stuffed sausage casings 11 into link forming sections 12 and thereafter advance the links through cooking, smoking and like processing chambers in a continuous operation. The conveyor 10 is suitable for use in a link forming and processing apparatus of the type illustrated in co-pending application Serial No. 185,167, filed April 4, 1962 which may be referred to for details of the apparatus not hereinafter described.

The conveyor 10 has a horizontally disposed upper run at one end of the apparatus which is supported on an upright frame 13. The frame 13 also supports a cross frame 13 also supports a cross frame 14 extending vertically above the upper run of the conveyor 10 on which there is mounted for reciprocation in a vertical plane a plurality of devices which co-operate with the casing constricting and neck forming devices on the conveyor 10 for dividing each of a plurality of lengths of stuffed sausage casings 11 which are fed thereto in parallel, laterally spaced relation into a connected series of link forming sections 12, the latter being frictionally held on the conveyor 10 while they are carried through the processing chambers by the conveyor 10.

The conveyor 10 on which the sausage links 12 are formed and conveyed comprises a pair of endless chains 15 and 15' (FIGURE 2) which are disposed in transversely spaced, parallel relation and carried on suitable sprockets spaced throughout the processing machine, two of the sprockets being indicated at 16 and 16' in FIGURE 1. The chains 15 and 15' are supported on guide rail members 17 and 17' mounted on the sides of the supporting stand 13 at the link forming station (FIGURE 1) so that the upper run of the conveyor 10 travels in a generally horizontal path during the linking operation. A plurality of cross bar assemblies 18 extend between chains 15 and 15' and are spaced longitudinally of the conveyor with the space between the assemblies 18 corresponding to the length desired for the links 12.

Each of the link forming cross bar assemblies 18 comprises a generally rectangular plate-like support bar 20 (FIGURES 3 to 9) which has a reinforcing rib 21 extending along its bottom or innermost marginal edge and angle bracket forming members 22 and 22' at its ends for attachment to the chains 15 and 15'. The support bars or plates 20 are mounted in transversely extending parallel relation on the chains 15 and 15' and are spaced longitudinally thereof according to the length desired for the links 12. Each of the support bars or plates 20 (FIG- URES 4 to 9) is preferably formed of a stiff metal plate and has a plurality of spaced, generally semi-circular slots or recesses 23 cut in its upper or outermost margins with portions 24 of the plate separating the slots and having a concave outer edge at 25. A circular aperture 26 is cut in each plate portion 24 with a slot 27 forming an entrance thereto from the outer edge 25. Each marginal recess 23 has associated therewith a casing constricting member or device 30.

Each casing constricting device 30 is formed of a strip or length of metal of relatively narrow width and rectangular cross section which has its center portion or section bent so as to provide an outwardly opening, generally V-shaped slot 31 defined by side wall or edge forming portions 32 and 32' which are disposed in outwardly diverging relation with their inner ends extending to spaced, parallel edge portions 33 and 33'. The edge portions 33 and 33' are of relatively short length and disposed in confronting relation so as to form a narrow slot 34 with a semi-circular inner terminus formed by a curved connecting edge portion 35 which joins the two edge portions 33 and 33'. The outer ends of the diverging edge portions 32 and 32' are connected to spaced parallel leg forming strip portions 36 and 36' by outwardly curved sections 37 and 37'. The leg forming portions 36 and 36' are disposed on opposite sides of the V-shaped center portion and have end portions 38 and 38' which are curved in a semi-circular shape so as to fit in the circular apertures 26 on opposite sides of the recesses 23 and to be clamped therein by a rivet forming member 40. The leg portions 36 and 36' of adjoining devices 30 are in side-by-side relation and each of the legs 36 and 36' has its end 38 and 38' caught in an aperture 26 by one of the rivet assemblies 40. The parallel portions 33 and 33' of the casing constricting device 30 which define the slot 34 and the section 35 connecting these portions are slotted at 41 in the plane of the support bar 20 to accommodate a wire clamping or neck retaining device 42. The wire spring device 42 which acts as a latch for retaining the neck forming constricted section 43 in the bottom of the slot 34 is formed by bending a relatively short piece of spring wire into the shape shown in FIGURES 4 and 5. The spring member 42 comprises an eye 44 at the lower end of two straight sections 45 and 45' with the upper or terminal ends 46 and 46' of the straight sections 45 and 45' curved into S shape and disposed opposite each other in normally abutting relation. In the operative position of the spring wire member 42 the curved ends 46 and 46' are positioned in the slot 41 and form a restriction in the slot or passageway 34 so that the constricted portion 43 of the casing (FIGURES 5 and 9) must be forced between the two end sections 46 and 46' of the spring wire member 42 and into the bottom of the slot 34 where it is retained until forced outwardly between the two end sections 46 and 46' of the spring member 42. The wire spring device 42 is retained on the plate 20 by fastening it in a key hole shaped recess 48 in one face of the plate 20 which opens into the marginal slot or recess 23 in the plate 20. The eye section 44 of the member 42 is seated in the key hole recess 48 and retained therein by a headed pin 50. The key hole recess 48 is shaped so as to retain the spring member 42 in proper position for the end portions 46 and 46' thereof to seat in the slot 41 of the member 30 while allowing the two legs 45 and 45' of the member 42 to separate when the constricted casing section 43 is forced outwardly between the end portions 46 and 46'.

In using the apparatus, the lengths of stuffed casing 11 are fed so that they are laid in the V-shaped slots defined by the edge forming members 32 and 32' of the necking or casing constricting devices 30 and the successive cross bar assemblies 18 are advanced by movement of the conveyor 10 to a linking station (FIGURE 1) where they are disposed beneath the cross bar 51 on the vertically reciprocating cross frame 14 which has a plurality of pairs of depending plates 52 with downwardly opening V-shaped slots 53 in the lower ends thereof. The slots 53 are vertically aligned with the V-shaped slots 31 in the casing constricting devices 30 and the cross bar 14 is reciprocated vertically by a suitable mechanism (not shown). The neck forming plates 52 are moved into straddling relation with the casing constricting devices 30 on each successive cross bar assembly 18 on the conveyor 10 and moved downwardly a sufficient distance so as to force the stuffed casings 11 down through the slots 34 into the pockets at the bottom thereof where the constricted portions of the casing are held by the spring devices 42 while the plates 52 are raised and the conveyor 10 advances the links 12 beyond the linking station and through the processing apparatus. The spring clips or neck retaining devices 42 are, of course, designed so that the casing sections may be forced between the curved ends 46 and 46' and removed therefrom without damage to the casing. The end members 46 and 46' co-operate with the portions 33, 33' and 35 of the devices 30 to form pockets for retaining the casing sections 43 in constricted relation and on the conveyor after the linking operation.

While particular materials and specific details of construction are referred to in describing the form of the apparatus which is illustrated, it will be understood that other materials and different structural details may be resorted to within the spirit of the invention.

I claim:

1. In a machine for linking stuffed sausage casings, a traveling conveyor having cross bar assemblies which are spaced a distance apart corresponding to the length of link desired, said cross bar assemblies each comprising a supporting cross bar member having individual casing constricting and holding members mounted in spaced relation along the outer margin thereof, said cross bar member having marginal recesses for accommodating portions of the casing constricting devices with the recesses separated by cross bar portions having circular apertures in which the casing constricting devices are mounted, each of said casing constricting and holding devices being formed of an elongate narrow strip of metal with the center portion thereof providing an outwardly opening, V-shaped slot formation defined by converging edge portions which have narrow confronting surfaces and a pocket of relatively small size in the bottom of the V, the pocket forming portions having a slot extending in a plane normal to the confronting surfaces of the converging edge portions, the end portions of the strip providing spaced, parallel legs on opposite sides of the center V-shaped portion with each of the legs having a terminal portion secured in one of the apertures in the portion of the cross bar member between said marginal recesses, and a spring clip formed by bending a short length of spring wire upon itself so as to provide an eye which is secured at the bottom of a marginal recess in the supporting bar and with S-shaped leg portions at the terminal ends thereof and disposed in subsantially abutting relation in the slot extending through the pocket formation at the bottom of the V and forming a restricted entrance thereto so as to frictionally retain a constricted portion of the casing in the pocket when the latter is forced between the ends of said leg portions.

2. In a machine for linking stuffed sausage casings, a traveling conveyor having cross bar assemblies which are spaced a distance apart corresponding to the length of link desired, said cross bar assembles each comprising a plate-like supporting cross bar member having individual casing constricting and holding devices mounted in spaced relation along the outer margin thereof, said cross bar member having slots extending inwardly of its outer margin for accommodating portions of the casing constricting and holding devices with the slots separated by cross bar portions having apertures in which the casing constricting and holding devices are mounted, said casing constricting and holding devices each being formed from an elongate narrow strip of metal which has a center portion providing an outwardly opening, V-shaped slot formation defined by edge portions disposed in inwardly converging relation and a small pocket in the bottom of the V, the end portions of the strip providing spaced parallel legs on opposite sides of the V-shaped center portion and each of the legs having its free end portion curved and seated in one of the apertures in a portion of the cross bar member between adjacent slots, and a spring clip associated with each V-shaped portion which is formed by bending a short length of spring wire upon itself so as to provide an eye and a pair of parallel legs with the leg ends bowed toward each other, the supporting bar having a recess in one face thereof at the bottom of each marginal slot in which the eye is secured with the leg portions of the spring clip extending to the pocket in the V-shaped portion, said V-shaped portion having a slot extending through the pocket at the bottom thereof for accommodating the bowed end portions of the legs of the wire clip, the latter forming a restricted entrance to the pocket so as to frictionally retain the constricted portion of the casing in the pocket.

3. In a machine for linking stuffed sausage casings, a traveling conveyor having cross bar assemblies which are spaced a distance apart corresponding to the length of link desired, said cross bar assemblies each comprising a plate-like supporting cross bar member having individual casing constricting and holding devices mounted in spaced relation along the outer margin thereof, said cross bar member having slots extending inwardly of its outer margin for accommodating portions of the casing constricting devices with the slots separated by cross bar portions having apertures in which the casing constricting and holding devices are mounted, said casing constricting and holding devices each being formed from an elongate narrow strip of metal which has a center portion providing an outwardly opening, V-shaped slot formation defined by inwardly converging end portions and a small pocket in the bottom of the V, the end portions of the strip extending in a direction to provide spaced parallel legs on opposite sides of the V-shaped center portion and each of the legs having its end portion seated in one of the apertures in the supporting portion of the cross bar member between adjacent slots, and a bent spring clip having an eye formation which is secured on a face of the supporting bar, and leg portions with S-shaped ends normally in abutting relation, said V-shaped center portion having a slot extending through the pocket formation at the bottom of the V and receiving the S-shaped ends of the spring so that the latter form a restricted entrance to said pocket formation and frictionally retain therein a constricted portion of the casing when it is forced between said ends and into the pocket.

4. In a machine for linking stuffed sausage casings, a traveling conveyor having cross bar assemblies which are spaced a distance apart corresponding to the length of link desired, said cross bar assemblies each comprising a supporting cross bar member having individual casing constricting and holding devices mounted in spaced relation along the outer margin thereof, said cross bar member having marginal slots for accommodating portions of the casing constricting devices with the slots separated by cross bar portions having apertures in which the casing constricting devices are mounted, each of said casing constricting and holding devices being formed of an elongate narrow strip of metal with the center portion thereof providing an outwardly opening, V-shaped slot formation defined by converging edge portions and a pocket of relatively small size in the bottom of the V, said center portion having a slot extending through the pocket forming portions and a casing gripping spring clip extending into the slot in the pocket for frictionally holding constricted portions of a casing in the pocket, the ends of the metal strip providing parallel legs spaced on opposite sides of the center V-shaped portion with each of the legs having a terminal portion seated in one of the apertures in the portion of the cross bar member separating a pair of said marginal slots.

5. In a machine for linking stuffed sausage casings, a traveling conveyor having cross bar assemblies which are spaced a distance apart corresponding to the length of link desired, said cross bar assemblies each comprising a supporting cross bar member having individual casing constricting and holding devices mounted in spaced relation along the outer margin thereof, said cross bar member having marginal slots for accommodating portions of the casing constricting devices with the slots separated by cross bar portions having small circular apertures with entrance slots opening on the outer edge of the cross bar member in which end portions of the casing constricting devices are seated, each of said casing constricting and holding devices being formed of an elongate narrow strip of metal having a portion thereof providing an outwardly opening, V-shaped slot formation defined by converging edges and a cylindrical pocket of relatively small diameter in the bottom of the V, the pocket forming portions having a slot extending in a plane normal to the oppositely disposed surfaces of the converging edge portions, and a casing gripping member in said slot for frictionally retaining a constricted casing therein portions of the metal strip providing parallel legs spaced on opposite sides of the V-shaped portion with each of the legs having a terminal portion seated in one of the apertures in a portion of the cross bar member separating a pair of said marginal slots.

6. In a machine for linking stuffed sausage casings, a traveling conveyor having cross bar assemblies which are spaced apart a distance corresponding to the length of link desired, said cross bar assemblies each comprising a plate-like supporting cross bar member having individual casing constricting and holding devices mounted in spaced relation along the outer margin thereof, said cross bar member having semi-circular slots extending inwardly of its outer margin for accommodating portions of the casing constricting devices with the slots separated by cross bar portions having apertures in which the casing constricting and holding devices are mounted, said casing constricting and holding devices each being formed from an elongate narrow strip of metal which has a portion thereof providing an outwardly opening, V-shaped slot formation defined by inwardly converging edge forming portions and a small cylindrical pocket in the bottom of the V, the end portions of the strip extending in a direction to provide spaced parallel legs on opposite sides of the V-shaped portion and each of the legs having its end portion seated in an aperture in a portion of the cross bar member between adjacent slots, and a spring clip secured on the supporting bar member with parallel leg portions having curved ends normally in abutting relation, and said V-shaped center portion having a slot extending through the pocket formation at the bottom of the V and receiving the curved ends of the spring clip, the latter forming a normally closed and expansible entrance to said pocket formation which frictionally retains therein a constricted portion of the casing when it is forced between said end and into the pocket.

References Cited by the Examiner
UNITED STATES PATENTS 1,718,896    6/1929    Dietrich _____ 17—34
3,059,272    10/1962    Millenaar _____ 17—34

SAMUEL KOREN, *Primary Examiner.*

LUCIE H. LAUDENSLAGER, *Examiner.*

UNITED STATES PATENT OFFICE
CERTIFICATE OF CORRECTION

Patent No. 3,220,053                      November 30, 1965

Hans H. Heydn

It is hereby certified that error appears in the above numbered patent requiring correction and that the said Letters Patent should read as corrected below.

Column 3, line 67, for "th" read -- the --; column 4, line 50, for "secured" read -- seated --; column 5, line 38, for "end" read -- edge --.

Signed and sealed this 6th day of September 1966.

(SEAL)
Attest:

ERNEST W. SWIDER                              EDWARD J. BRENNER
Attesting Officer                                     Commissioner of Patents